(12) United States Patent
Tuthill et al.

(10) Patent No.: US 11,696,569 B2
(45) Date of Patent: Jul. 11, 2023

(54) SCRATCHING APPARATUS

(71) Applicant: HEBE STUDIO LIMITED, Banbury (GB)

(72) Inventors: James Tuthill, Headington (GB); Johannes Paul, London (GB); Simon Nicholls, Daventry (GB); William Windham, Banbury (GB)

(73) Assignee: HEBE STUDIO LIMITED, Banbury (GB)

( * ) Notice: Subject to any disclaimer, the term of this patent is extended or adjusted under 35 U.S.C. 154(b) by 0 days.

(21) Appl. No.: 17/351,515

(22) Filed: Jun. 18, 2021

(65) Prior Publication Data
US 2021/0392854 A1    Dec. 23, 2021

(30) Foreign Application Priority Data

Jun. 18, 2020 (GB) ..................................... 2009365

(51) Int. Cl.
*A01K 15/02* (2006.01)

(52) U.S. Cl.
CPC .................................. *A01K 15/024* (2013.01)

(58) Field of Classification Search
CPC ... A01K 15/024; A01K 13/004; A01K 15/027
USPC ......................................................... 119/706
See application file for complete search history.

(56) References Cited

U.S. PATENT DOCUMENTS

| | | | | |
|---|---|---|---|---|
| 2,005,817 A | * | 6/1935 | Yoder | A01K 15/024 119/711 |
| 2,438,731 A | * | 3/1948 | Wedeking | A01K 13/004 119/656 |
| 2,888,906 A | * | 6/1959 | Delp | A01K 13/004 119/656 |
| 2,997,019 A | * | 8/1961 | Bryson | A01K 15/024 119/706 |
| 3,479,990 A | * | 11/1969 | Crow | A01K 15/024 248/200.1 |
| 3,993,027 A | | 11/1976 | Mullin | |
| 4,177,763 A | * | 12/1979 | Cook | A01K 13/004 119/706 |
| 5,067,440 A | * | 11/1991 | Hatten | A01K 15/024 119/706 |
| D348,124 S | * | 6/1994 | O'Rourke | D30/160 |
| 5,577,466 A | * | 11/1996 | Luxford | A01K 15/024 119/485 |

(Continued)

FOREIGN PATENT DOCUMENTS

CN        205813170 U    12/2016

OTHER PUBLICATIONS

United Kingdom Intellectual Property Office, Search Report of Application No. GB2009365.4; dated Nov. 24, 2020; pp. 1.

(Continued)

*Primary Examiner* — Timothy D Collins
*Assistant Examiner* — Maria E Graber
(74) *Attorney, Agent, or Firm* — Taft Stettinius & Hollister LLP; Stephen F. Rost (57) ABSTRACT

Scratching apparatus 1 comprising a plurality of scratchable sacrificial elements 7 that can be assembled together to form a tower 5, and a base 3 having a first surface on which the tower 5 can be mounted so that the tower 5 is generally upstanding from the base 3 when the apparatus 1 is in use.

18 Claims, 7 Drawing Sheets

(56) References Cited

U.S. PATENT DOCUMENTS

| | | | | |
|---|---|---|---|---|
| 5,884,586 | A * | 3/1999 | Carbonelli | A01K 15/024 119/485 |
| 6,345,593 | B1 * | 2/2002 | Stewart | A01K 15/024 119/706 |
| 2001/0045191 | A1 * | 11/2001 | Gear | A01K 15/024 119/706 |
| 2002/0179021 | A1 * | 12/2002 | Deraspe-Bolles | A01K 1/035 119/706 |
| 2002/0195064 | A1 * | 12/2002 | Robertson | A01K 15/024 119/706 |
| 2003/0192486 | A1 * | 10/2003 | DeRaspe-Bolles | A01K 15/024 119/706 |
| 2003/0221628 | A1 * | 12/2003 | Leon | A01K 15/024 119/28.5 |
| 2005/0011469 | A1 * | 1/2005 | Lipscomb | A01K 15/024 119/706 |
| 2008/0196675 | A1 * | 8/2008 | Murrer | A01K 15/027 119/706 |
| 2008/0282987 | A1 * | 11/2008 | Ritchey | A01K 15/024 119/28.5 |
| 2010/0154719 | A1 * | 6/2010 | Kellogg | A01K 15/025 119/702 |
| 2010/0326367 | A1 * | 12/2010 | Wedertz | A01K 15/024 119/706 |
| 2011/0253060 | A1 * | 10/2011 | Schotthoefer | A01K 15/024 119/706 |
| 2012/0090552 | A1 | 4/2012 | Haaf | |
| 2012/0090553 | A1 * | 4/2012 | Haaf | A01K 15/024 119/706 |
| 2017/0112098 | A1 * | 4/2017 | Lee | A01K 15/024 |
| 2017/0202181 | A1 * | 7/2017 | Hartelius | A01K 15/024 |
| 2017/0350159 | A1 * | 12/2017 | Tuthill | E04H 12/223 |
| 2019/0246605 | A1 | 8/2019 | Chen | |

OTHER PUBLICATIONS

Amazon; Catit_Senses_Oval_Scratcher_Amazon.co.uk; pp. 1-9.
Amazon; Trixie_Parla_Scratching_Post_62_cm_platinum_grey_Amazon.co.uk; pp. 1-10.

* cited by examiner

SCRATCHING APPARATUS

This application claims the priority of foreign Application No. GB2009365.4 filed Jun. 18, 2020. The disclosure of which are hereby incorporated herein in their entirety.

FIELD

This disclosure relates to scratching apparatus, also colloquially known as scratching posts, particularly but not exclusively to scratching apparatus for felines such as domestic cats.

BACKGROUND

It is well known that felines such as domestic cats have a natural urge to scratch their claws against rough surfaces. The act of scratching is thought to de-stress cats and make them calmer, as well as having other benefits such as removing old material from their claws and enabling them to mark their territory.

As many cat owners will attest, cats often choose items of furniture such as sofas and table or chair legs to scratch their claws against, and in an attempt to discourage such behaviour many owners purchase scratching apparatus, more usually known as scratching posts. A typical example of a previously proposed scratching post is the "Trixie Parla" 62 cm scratching post sold by Amazon.co.uk. This post comprises a generally rectangular covered base, and a post upstanding from the base that has a sisal rope wound around its' peripheral surface.

Whilst such posts can be effective in encouraging cats to scratch against the post instead of an item of furniture, it is the case that the action of the cat scratching on the sisal rope tends to damage the rope over time and makes the post as a whole less effective. If this should happen, the only recourse for the user is to purchase a new replacement scratching post, which is both expensive and unnecessarily wasteful.

To address such issues, it has previously been proposed in United States Patent Application number 2002/0195064 to provide scratching apparatus that comprises a base and upstanding post, as per conventional scratching posts, and a removable and hence replaceable scratchable cover that is attached to the post by means of a hook-and-loop fixing system such as Velcro™.

Whilst this arrangement is more sustainable than scratching apparatus of the Trixie Parla type mentioned above, the cover still needs to be thrown away and replaced when it has been worn out. Furthermore, since the cover has strips of Velcro attached to it, it is no longer fully biodegradable.

To address such issues, it has previously been proposed to provide cardboard scratching mats, such as the Catit Senses 2.0 Oval Scratching Board (available from Petplanet.co.uk). This scratching board is formed of high density corrugated cardboard, and hence is biodegradable. However, whilst this board is more environmentally friendly than the other arrangements mentioned above, it suffers from the disadvantage that as it is configured to be laid on a surface, a cat using the board cannot undertake the full range of stretching activities that are beneficial for felines, such as standing on their hind legs to stretch their back.

An ancillary issue is that as the Catit Senses 2.0 Oval Scratching Board includes a large central recess, the amount of packaging required to ship product to customers is increased as compared, for example, with a flat-packed product. This is both commercially and environmentally undesirable.

The scratching apparatus disclosed herein has been devised with at least some of the aforementioned issues in mind.

SUMMARY

A first embodiment of the present disclosure provides scratching apparatus comprising a plurality of scratchable sacrificial elements that can be assembled together to form a tower, and a base having a first surface on which the tower can be provided so that the tower is generally upstanding from the base when the apparatus is in use. This arrangement has the advantage, as compared with the aforementioned Catit Senses 2.0 Oval Scratching Board for example, that a cat using the scratching apparatus can undertake a larger range of stretching activities. Furthermore, as it is envisaged that the apparatus disclosed herein can be supplied to customers for self-assembly, the size and amount of packaging can be reduced as compared with the abovementioned Catit product, for example, with attendant commercial and environmental benefits.

Adjacent sacrificial elements that form the tower can optionally be coupled to one another. This enhances the structural rigidity of the tower, and hence the apparatus as a whole. To further enhance the structure of the apparatus a plurality of adhesive fixings may be provided for coupling adjacent sacrificial elements together. The apparatus may optionally comprise one or more fixings for coupling the tower to said base. The apparatus may optionally comprise an adhesive fixing for coupling the tower to the base.

The apparatus may comprise one or more rotation-resisting fixings for coupling the tower to the base in such a manner that rotation of the tower relative to the base in use is resisted.

In one envisaged arrangement the apparatus may comprise a support insertable through the sacrificial elements that form said tower to stabilise the tower. The support may be engageable with the base.9. The support may comprise a support base, and a rod upstanding from said support base. Preferably the base includes a recess for accommodating said support base.

In one arrangement the sacrificial elements may each include an aperture, the apertures in said sacrificial elements being alignable to form a passageway for accommodating the rod of said support.

The support may optionally be configured to positively engage with respective elements.

The apparatus may optionally comprise a supplementary support rod and a coupling for engaging said supplementary support rod to the support rod of said support.

In one arrangement the apparatus may comprise a cap and a fixing for coupling the cap to the rod so that the tower is sandwiched between the cap and the base. In another arrangement the apparatus may comprise a cap and a fixing for coupling the cap to the supplementary support rod so that the tower is sandwiched between the cap and the base. In either case, the fixing can optionally be tightened to clamp the tower between the base and the cap.

Preferably said elements are of a biodegradable material, for example of cardboard, and optionally formed from recycled material.

Another aspect of the present disclosure concerns a scratchable tower kit configured for use with the apparatus disclosed herein, the kit comprising a plurality of scratchable sacrificial elements configured for assembly into a tower for coupling to the base of the scratching apparatus of any preceding claim. The scratchable elements may optionally be supplied ready-assembled as a scratchable tower for coupling to said base.

A further aspect of the present disclosure concerns scratching apparatus that comprises a base with a captive nut, and a support rod having a first threaded end that is engageable with the aforementioned nut in the base so that the rod is upstanding from the base, said rod further comprising a second end remote from the first that includes an internal bolt or other coupling with which a fixing can be engaged, the apparatus further comprising a plurality of sacrificial scratchable elements, each including an aperture extending through the element from one major face to another, said sacrificial elements being stackable on the upstanding rod to form a tower of stacked elements; and a cap for coupling to the rod by means of an appropriate fixing, for example a screw, that extends through the cap and into engagement with the coupling in the aforementioned second end of the rod, which fixing being capable of being tightened to clamp the elements between the cap and the base, and thereby reduce the likelihood of elements rotating about the rod when the apparatus is in use.

Other features and aspects of the apparatus are disclosed below.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Before embarking upon a detailed description of various implementations of the apparatus disclosed herein, it is appropriate to mention that references to orientations (such as "upper", "lower", "top" and "bottom") are intended to refer to the apparatus in normal use, and are not intended to limit the scope of the disclosure—in particular in other circumstances, for example when the apparatus is packaged for sale or transport.

Figure 1:
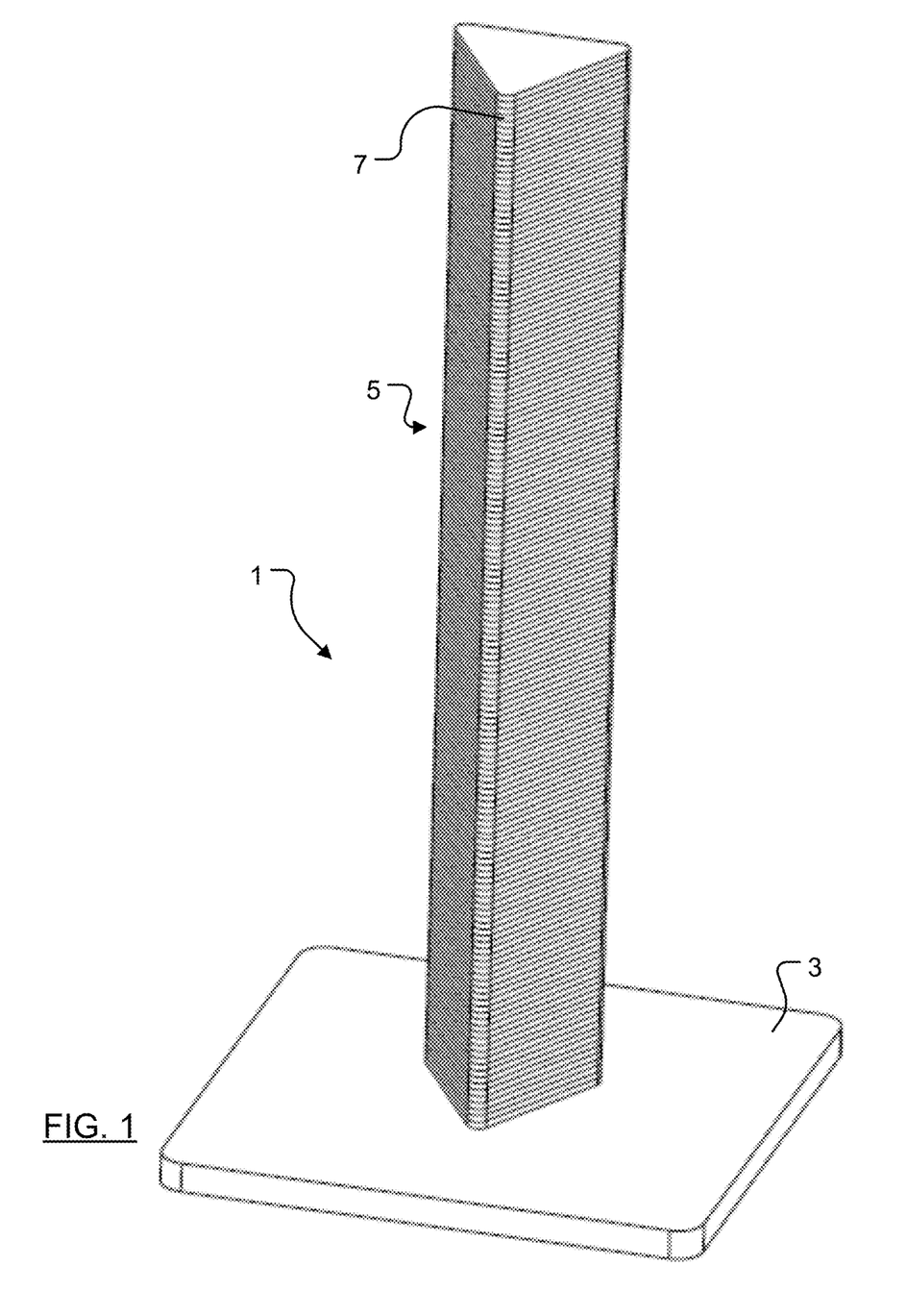
FIG. 1 is a schematic perspective view of one embodiment of scratching apparatus according to the present disclosure.

Referring now to FIG. 1 of the accompanying drawings, there is depicted a schematic perspective view of one embodiment of scratching apparatus 1 according to the present disclosure.

The apparatus 1 comprises a base 3 having a first surface on which a scratchable tower 5 has been mounted. The tower 5 comprises a plurality of sacrificial scratchable elements 7 that have been coupled together, and is provided on the bases so as to extend generally perpendicularly from the aforementioned first surface (which first surface will be uppermost when the apparatus is in use).

In this particular example, the sacrificial elements are coupled together by means of adhesive inserts (not shown), such as a piece of double-sided sticky tape, provided between adjacent elements. The tower 5 formed by the coupled sacrificial elements is coupled to the base, in this particular arrangement, by means of a similar adhesive insert to secure the tower to the base in an upright position and to stop the tower 5 from rotating relative to the base 3.

The sacrificial elements are of any material that is suitable for being scratched by an animal, such as a cat. In one envisaged implementation, the sacrificial elements are of cardboard, for example of cardboard formed from recycled material such as paper, hemp or the like. The elements are "sacrificial" in the sense that in the course of the apparatus being used, the elements are progressively destroyed.

Figure 8:
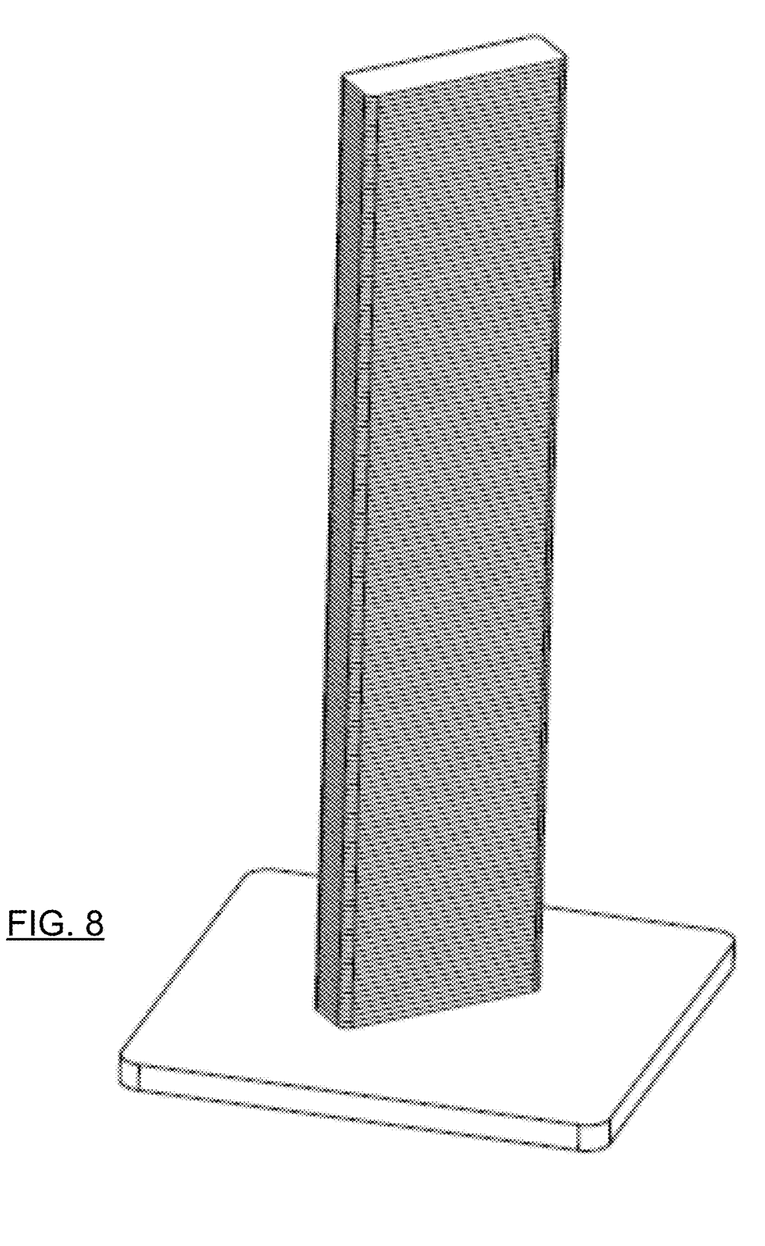
FIG. 8 is a schematic perspective view of another scratching apparatus.

In the depicted arrangement, the elements are generally triangular and are all of substantially the same shape. In other envisaged arrangements the elements may have a different shape, and need not necessarily all have the same shape. For example, the elements could be circular, or shaped like a lozenge, rhombus, rounded rectangle (as in the example depicted in FIG. 8), rectangle, or parallelogram.

In this particular arrangement, the tower is self-supported on the base and it will be appreciated that once the sacrificial elements that make up the tower have been degraded in use, a degraded tower can be unstuck from the base and replaced.

Figure 2:
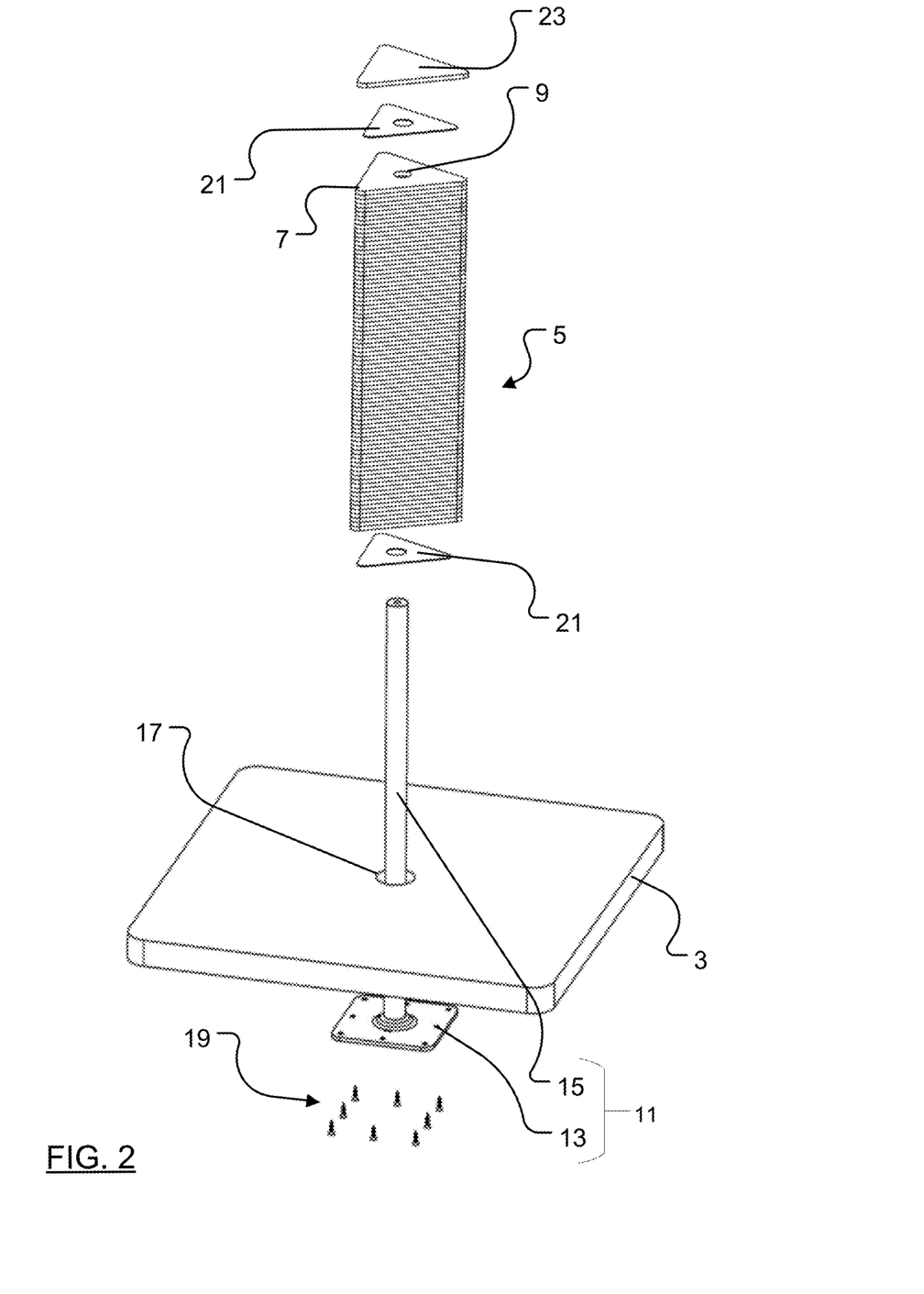
FIG. 2 is an exploded perspective view of another embodiment of scratching apparatus.

FIG. 2 is an exploded schematic perspective view of another contemplated arrangement in which the tower is mounted on a support 11 that helps to maintain the orientation of the tower with respect to the base.

Referring now to FIG. 2, in this implementation each of the sacrificial elements 7 is provided with an aperture 9, and the elements 7 can be aligned so that the respective apertures align to form a channel through the tower 5.

The support 11 comprises a support base 13 and a support rod 15 that extends from the base. The base 3 includes an aperture 17, and the rod 15 of the support 11 can be passed up through the base until the support base 13 abuts against one face of the base 3, whereupon the rod 15 will extend from an opposite face of the base 3. The support base 13 can then be attached, for example by means of a plurality of fixings 19 (in this instance, screws), to the base 3, and the rod 15 can be slid into the channel formed by the aligned apertures 9 in the elements 7 that make up the tower 5.

In one envisaged implementation the base 3 includes a recess around the aperture 17 in which the support base 13 locates. This arrangement lifts the support base 13 off a surface on which the scratching apparatus sits (such as a floor for example), and hence reduces the likelihood of the support base 13 inadvertently scratching that surface.

In this arrangement the tower 5 is fixed, for example adhered by a piece of double-sided sticky tape 21, to the base 3 to resist rotation of the tower about the support rod 15 in use, and a cap 23 is secured to an end of the tower 5 remote from the base 3, in this instance by means of another piece of double-sided tape 21. The cap 23 may comprise a sacrificial element that is without an aperture 9 and could be marked to indicate to a user assembling the tower that the cap is intended to fit on the top of the tower. In other arrangements, the cap may be of any other suitable material, for example of plastics material.

Figure 3:
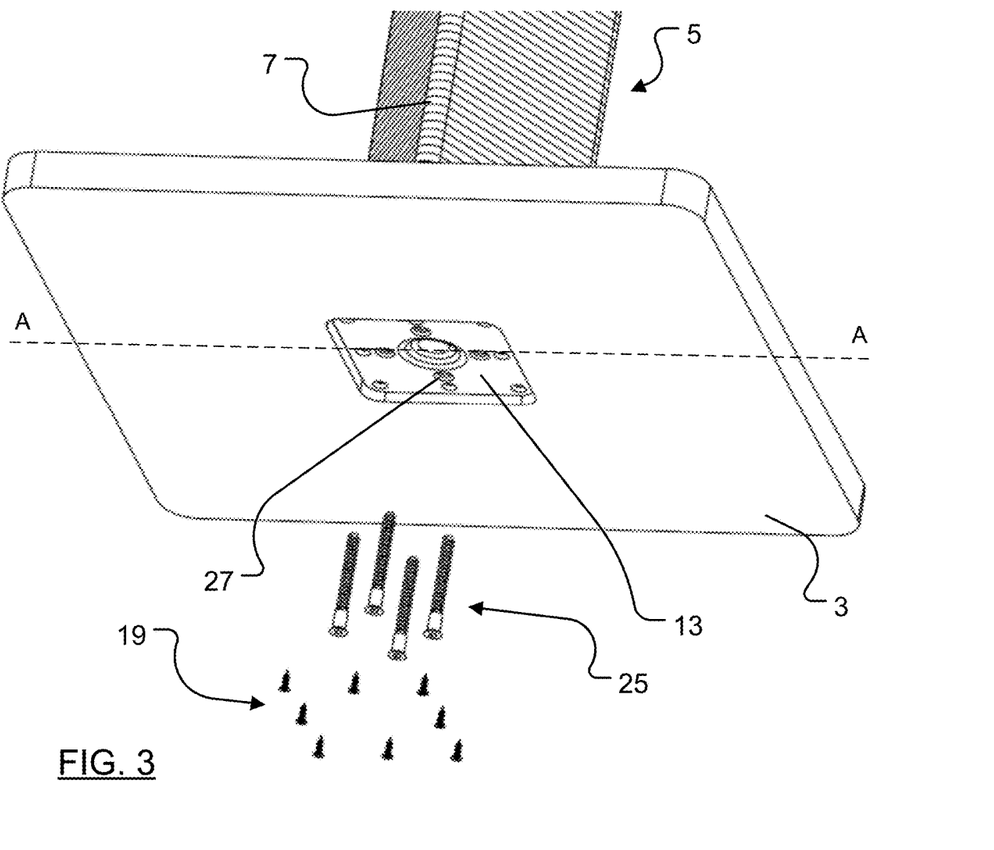
FIG. 3 is an exploded view of part of another embodiment of scratching apparatus.
Figure 4:
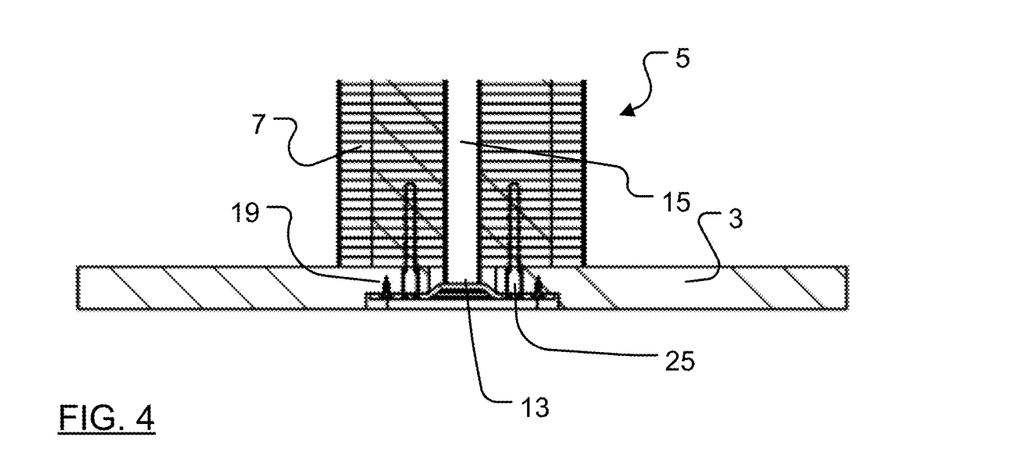
FIG. 4 is a schematic cross-sectional view along the line A-A of FIG. 3 showing part of the apparatus depicted in FIG. 3 in its' assembled form.

FIG. 3 is a schematic perspective view of the underside of the base of another scratching apparatus, and FIG. 4 is a schematic cross-sectional view along the line A-A of FIG. 3 showing part of the apparatus in its' assembled form.

This arrangement is identical in all respects to the arrangement depicted in FIG. 2, except for the fact that the apparatus of this particular arrangement includes a plurality of rotation-resisting fixings 25, in this instance screws, that can be inserted through holes 27 in the support base 13 and corresponding holes in the base 3 and engaged with at least some of the sacrificial elements 7 that make up the tower 5. In this arrangement, the tape 21 coupling the tower 5 to the base 3 can either be dispensed with or retained, as the user desires. The fixings 23 assist with maintenance of the orientation of the tower 5 with respect to the base by resisting rotation of the tower about the support rod 15 (FIG. 4) when the apparatus is in use.

The fixings are generally of such a length as to engage with half a dozen or so of the sacrificial elements of the tower that are closest to the base. Longer or shorter fixings may be employed if desired. For example, the fixings could even be of such a length that they extend through substantially all of the elements that make up the tower. Whilst a plurality of fixings is preferred, it is also envisaged that only one fixing may be required to resist rotation of the tower with respect to the base.

In one arrangement, the sacrificial elements that are intended to engage with the fixings may be provided with appropriately located pilot holes to assist with engagement of the fixings with the tower. In this instance, it is envisaged that those elements which are intended to be engaged with the fixings may be marked, for example by means of a different colour, so that a user assembling the tower 5 is advised to attach these elements to one another.

As will be appreciated, whilst the support rod can be of any desired length, care should be taken to ensure that the base is large enough to resist toppling of the tower when an animal leans against the tower in use.

Whilst such an arrangement functions adequately, it suffers from the disadvantage that once the elements in a given section of tower have been degraded, the entire tower must be replaced.

Figure 5:
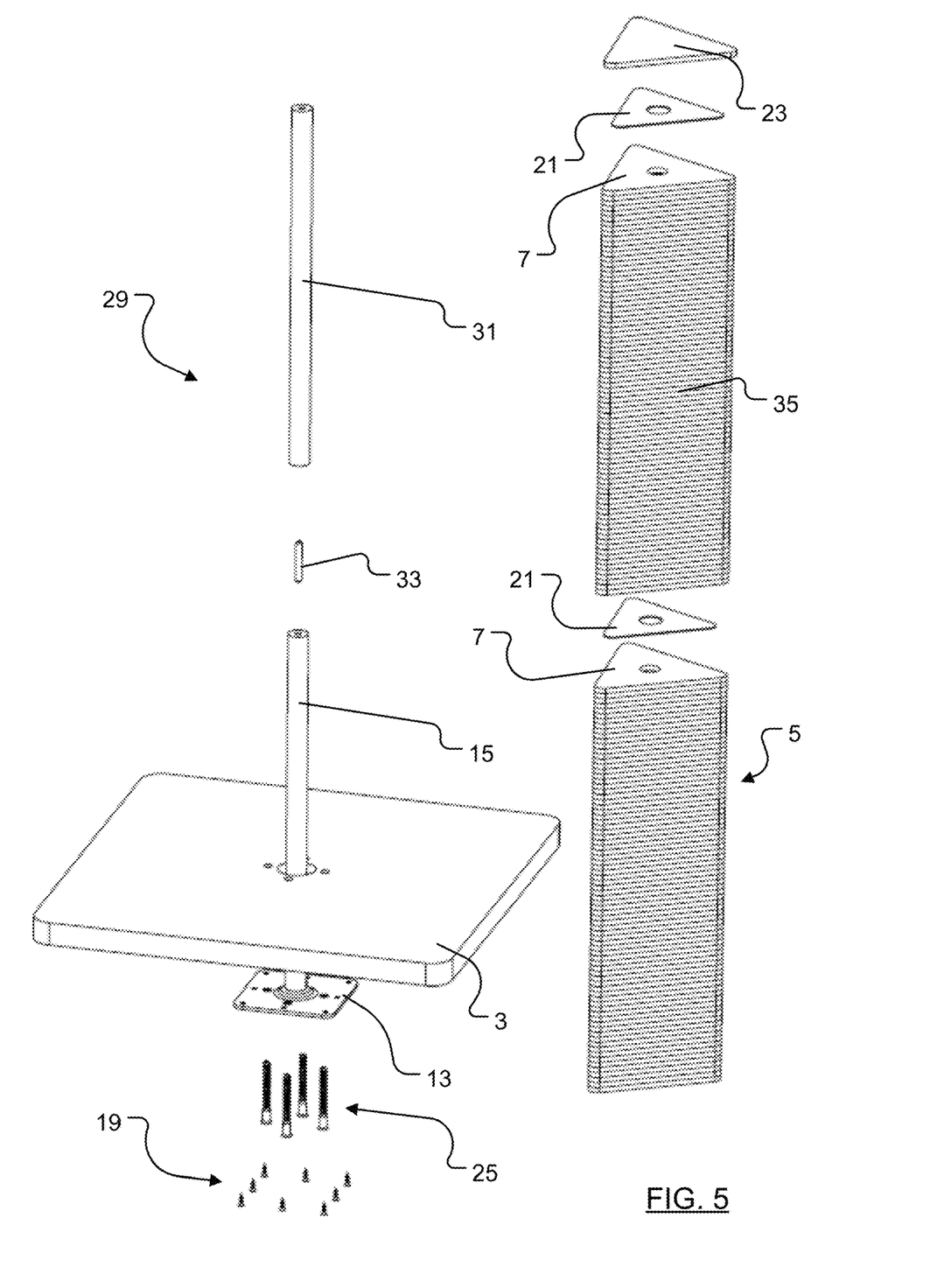
FIG. 5 is an exploded schematic perspective view of modular scratching apparatus.

To address this issue, it is proposed to provide modular scratching apparatus 29 as depicted schematically in FIG. 5 of the accompanying drawings. Features common to this arrangement and other earlier-mentioned arrangements have been denoted with the same reference numeral.

The apparatus of this embodiment comprises, in addition to the components of the apparatus depicted in FIGS. 3 and 4, a supplementary support rod 31 that can be coupled to the rod 15 of the support 11 by means of a suitable coupling 33 to form an extended support rod. In one envisaged implementation, the coupling comprises a threaded rod that can be screwed into a complementary thread formed in an end of the rod 15 remote from the support base 13 and into a complementary thread formed in either end of the supplementary support rod 31. Other suitable couplings will be apparent to persons of skill in the art.

The apparatus 29 further comprises a second tower 35 that is also formed from a plurality of sacrificial elements 7. The second tower 35 is coupled to the tower 5, for example by means of a piece of double-sided sticky tape 21, and the cap 23 is affixed to the free end of the second tower 35 to form an extended tower. Once assembled, the extended tower (comprised of tower 5 and secondary tower 35) can be fitted over the extended support rod and the fixings 25 can be engaged with the extended tower to resist rotation of the extended tower about the rod.

As with the arrangement depicted in FIG. 2, the rotation-resisting fixings 25 could be omitted if desired and the extended tower otherwise affixed to the base (for example by means of a piece of double-sided sticky tape) to resist rotation of the extended tower relative to the base.

An advantage of the arrangement depicted in FIG. 5 is that as the extended tower is longer, an animal using the apparatus can stretch to a greater extent than they can with the apparatus of FIG. 2, for example. Furthermore, as the extended tower is in multiple parts, if one part should be degraded more than the other then only the part that is more degraded need be replaced, thereby reducing wastage.

Figure 6:
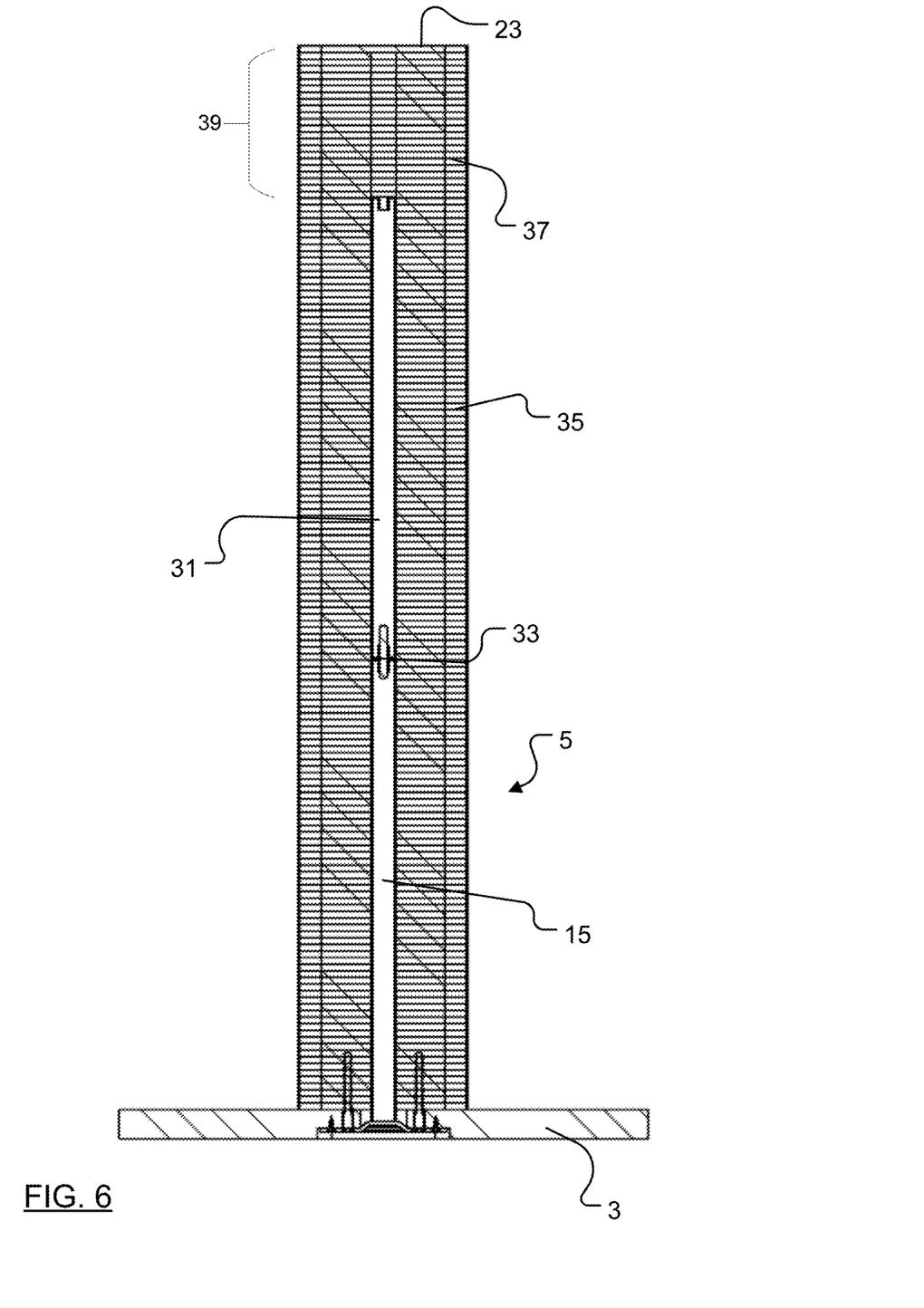
FIG. 6 is a schematic cross-sectional view of another scratching apparatus.

In the arrangement depicted in FIG. 5, the extended support rod is substantially the same length as the extended tower. In another envisaged arrangement, depicted in schematic cross-section in FIG. 6, the extended support rod is substantially shorter than the extended tower that it supports. In this configuration a plurality of sacrificial elements 37 that are without the aperture 9 of the element 7 depicted in FIG. 2 are affixed to the second tower 35 (between the second tower 35 and the cap 23) to provide a section 39 of tower that the support does not pass through.

Figure 7:
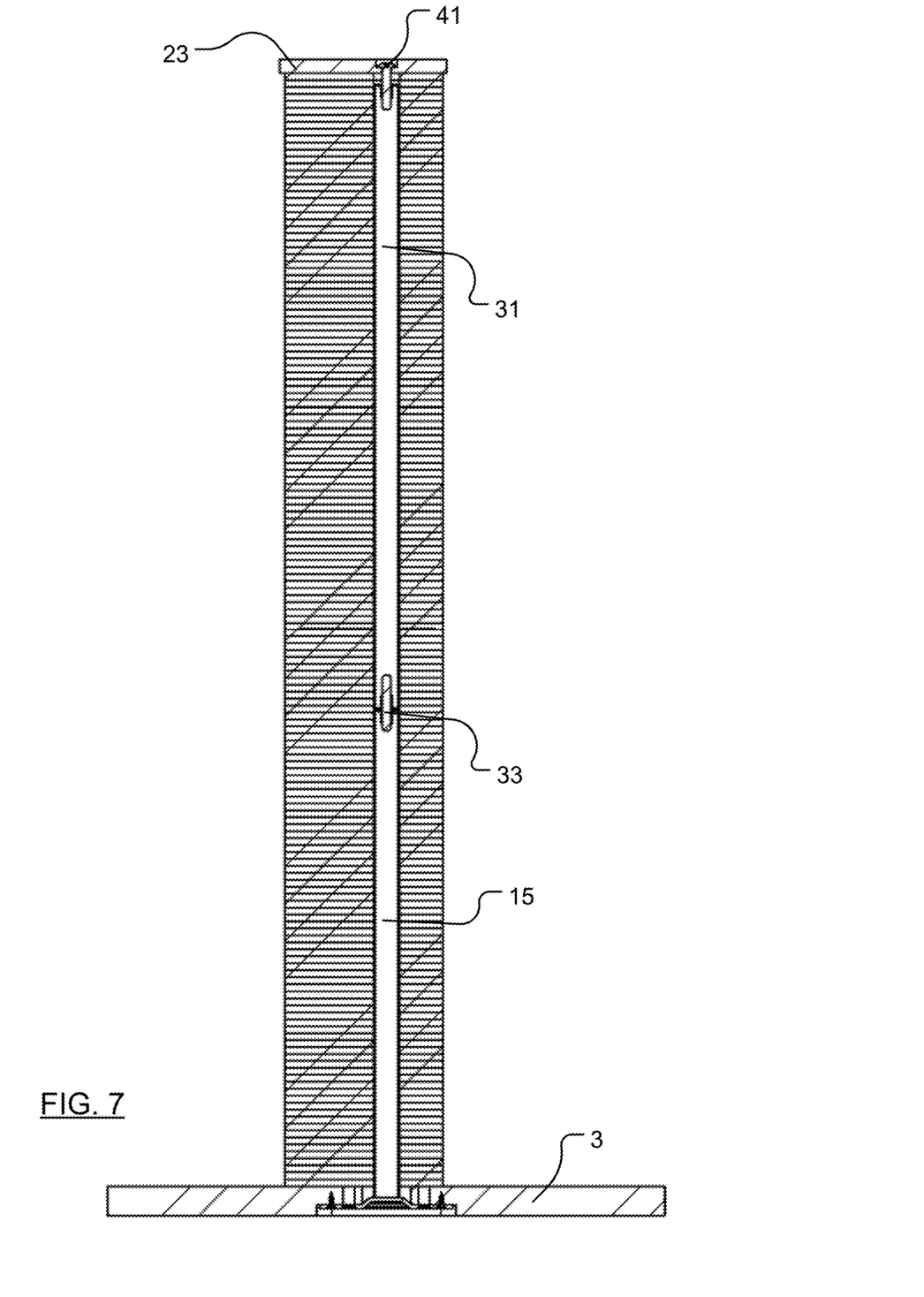
FIG. 7 is a schematic cross-sectional view of another scratching apparatus.

FIG. 7 is a schematic cross-sectional view of another envisaged arrangement. In this arrangement, the cap 23 includes a recessed aperture through which a fixing 41, such as a threaded bolt, can be passed to engage with the free end of the extended supplementary support rod 31. An advantage of this arrangement is that the cap can be tightened against the extended tower to clamp the tower between the cap and the base 3, thereby further reducing the likelihood of the tower moving relative to the base in use. It is envisaged that the clamping effect provided by the arrangement may be configured to be sufficient to negate the need to couple adjacent sacrificial elements together and/or to negate the need to couple the tower to the base (either by means of the aforementioned pieces of double-sided sticky tape and/or by means of the rotation-resistant fixings).

This particular aspect of the disclosure could also be applied to the apparatus described above in connection with FIG. 2. In other words, a cap of the type employed in the arrangement depicted in FIG. 7 could be employed with the arrangement depicted in FIG. 2.

It will be appreciated that whilst various aspects and embodiments of the present disclosure have heretofore been described, the scope of the present disclosure is not limited to the particular arrangements set out herein and instead extends to encompass all arrangements, equivalents, modifications and alterations thereto, which fall within the spirit and scope of the appended claims. For example, it is conceivable that instead of the support simply locating in a channel within the tower, the support could positively engage with the tower. For example, the support could be externally threaded and screwed into the elements that combine to provide the tower.

It is also the case that fixings other than double-sided sticky tape, for example a two-part mechanical hook and loop fastener such as Velcro™, could instead be employed to couple adjacent elements, and/or to couple the tower to the base.

In addition, whilst particular arrangements described above disclose the concept of a single supplementary support rod that is engageable with the rod of the support, it is anticipated that a plurality of supplementary rods could be provided—a first for engagement with the rod of the support that is immediately adjacent the base, and a second for engagement with the first supplementary support rod.

In another envisaged arrangement, the tower could be supplied to a user pre-assembled (that is to say, with the elements coupled together to form the tower). Such an arrangement would facilitate the assembly process, but at the likely expense of being bulkier (and hence more expensive) to transport.

In another envisaged arrangement, the support may simply comprise a rod that is configured to engage directly with the base. For example, an end of the rod may be externally threaded and configured to engage with a captive nut mounted in the base.

In one envisaged implementation, the scratching apparatus may comprise a base with a captive nut, and a support rod having a first threaded end that is engageable with the aforementioned nut in the base so that the rod is upstanding from the base. The rod has a second end remote from the first that includes an internal bolt or other coupling with which a fixing can be engaged. A plurality of sacrificial scratchable elements are provided, each including an aperture extending through the element from one major face to the other. The sacrificial elements can be stacked on the upstanding rod to form a tower of stacked elements. A cap can then be coupled to the rod (with the rod extending through aligned apertures in the elements) by means of an appropriate fixing, for example a screw, that extends through the cap and into engagement with the coupling in the aforementioned second end of the rod. The fixing can then be tightened to clamp the elements between the cap and the base, and thereby reduce the likelihood of elements rotating about the rod when the apparatus is in use.

Such an arrangement has numerous advantages. Firstly, as adjacent elements need not be coupled together, the tower can quickly be assembled by a user. Secondly, a user can replace any one or more of the elements as they are degraded in use. Finally, the components of the apparatus, and indeed replacement tower elements, can be packed particularly efficiently, thereby reducing packaging wastage and transportation costs.

It should also be noted that whilst the accompanying claims set out particular combinations of features described herein, the scope of the present disclosure is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. Scratching apparatus comprising:
a plurality of scratchable sacrificial elements that can be assembled together to form a tower, wherein the plurality of scratchable sacrificial elements each include an aperture extending through the scratchable sacrificial element from one major face to the other such that each of the scratchable sacrificial elements align to form a channel defined by each aperture of each of the plurality of scratchable sacrificial elements, a support rod, a cap, a tightening fixing for coupling the cap to the support rod, and a base having a first surface on which the tower can be mounted so that the tower is generally upstanding from the base when the apparatus is in use, wherein tightening the tightening fixing against the cap clamps the tower between the cap and the base, wherein the scratchable sacrificial elements are stackable on the support rod to form a tower of stacked sacrificial elements, and wherein the support rod is insertable through the apertures of each of the plurality of scratchable sacrificial elements that form the tower to stabilize the tower.

2. Apparatus according to claim 1, wherein said support rod is engageable with the base.

3. Apparatus according to claim 1, wherein said scratchable sacrificial elements are of a biodegradable material, including but not limited to cardboard.

4. Apparatus according to claim 1, wherein adjacent scratchable sacrificial elements that form the tower are coupled to one another.

5. Apparatus according to claim 4, comprising a plurality of adhesive fixings for coupling adjacent scratchable sacrificial elements together.

6. Apparatus according to claim 1, comprising one or more rotation-resisting fixings for coupling the tower to said base.

7. Apparatus according to claim 6, wherein the one or more rotation resisting fixings include an adhesive fixing for coupling the tower to the base.

8. Apparatus according to claim 6, wherein the one or more rotation-resisting fixings for coupling the tower to the base are provided to resist rotation of the tower relative to the base when the scratching apparatus is in use.

9. Apparatus according to claim 1, wherein said support rod comprises a support base and the support rod is upstanding from said support base.

10. Apparatus according to claim 9, wherein said base includes a recess for accommodating said support base.

11. Apparatus according to claim 9, wherein said support rod is configured to positively engage with respective scratchable sacrificial elements.

12. Apparatus according to claim 9, comprising a supplementary support rod and a coupling rod for engaging said supplementary support rod with the support rod to form an extended support rod.

13. Apparatus according to claim 12, wherein the cap and the tightening fixing couple the cap to the supplementary support rod so that the tower is sandwiched between the cap and the base.

14. Apparatus according to claim 9, wherein the cap and the tightening fixing couple the cap to the rod so that the tower is sandwiched between the cap and the base.

15. Apparatus according to claim 14, wherein the tightening fixing can be tightened to clamp the tower between the base and the cap.

16. A scratchable tower kit configured for use with the apparatus of claim 1, the kit comprising the plurality of scratchable sacrificial elements configured for assembly into a tower for coupling to the base of the scratching apparatus.

17. The kit according to claim 16, wherein the scratchable sacrificial elements are supplied ready-assembled as a scratchable tower for coupling to said base.

18. Scratching apparatus comprising:
a plurality of scratchable sacrificial elements that can be assembled together to form a tower wherein the plurality of scratchable sacrificial elements each include an aperture extending through the scratchable sacrificial elements from one major face to the other such that the scratchable sacrificial elements align to form a channel;
a base having a first surface on which the tower can be mounted so that the tower is generally upstanding from the base when the apparatus is in use;

a support insertable through the apertures of the sacrificial elements that form said tower to stabilise the tower, wherein said support comprises a support base, and a rod upstanding from said support base, wherein the rod is insertable through apertures of the scratchable sacrificial elements, said apparatus further comprising:

a supplementary support rod and a coupling rod for engaging said supplementary support rod with the support rod of said support;

a cap, and a tightening fixing for coupling the cap to the supplementary support rod so that the tower is sandwiched between the cap and the base.

* * * * *